Oct. 6, 1953 — L. B. HEESEN — 2,654,585
APPARATUS FOR PREPARING FOAM-LIKE SUBSTANCES, SUCH AS WHIPPED CREAM
Filed Oct. 11, 1950 — 2 Sheets-Sheet 2

INVENTOR
Leonardus Bernardinus Heesen,

BY Wenderoth, Lind & Ponack

ATTORNEYS

Patented Oct. 6, 1953

2,654,585

UNITED STATES PATENT OFFICE 2,654,585

APPARATUS FOR PREPARING FOAM-LIKE
SUBSTANCES SUCH AS WHIPPED CREAM

Leonardus Bernardinus Heesen,
Amsterdam, Netherlands

Application October 11, 1950, Serial No. 189,634
In the Netherlands July 19, 1950

3 Claims. (Cl. 261—19)

This invention relates to an apparatus for preparing a foam-like substance.

If such an apparatus is intended for preparing substances, such as whipped cream, which are not constantly but periodically drawn off, the difficulty often presents itself, that, as a result of the apparatus being out of operation between the periods of drawing off, the inlet for the compressed gas to the ascending pipe gets clogged up with the liquid flowing back from the mixing member. At the moment when the drawing off operation is to be resumed the apparatus appears to be out of order then and to deliver a substance of inferior quality.

In order to remove such a break-down a partial dismantling of the apparatus is necessary which causes a considerable delay, mostly at a moment when this is extremely awkward.

It is the object of this invention to overcome this drawback by an improved construction of the apparatus.

To this end use is made according to the invention of an apparatus comprising a closed vessel for receiving a liquid, in which vessel an ascending pipe is provided which reaches approximately to the bottom of the vessel, through which pipe the liquid kept under pressure by means of a compressed gas tank which is connected to the vessel at a point above the level of the liquid contained therein, is pressed to a mixing member with an associated discharge cock, in which mixing member the liquid is intimately mixed with a portion of the gas present in the vessel above the level of the liquid, which gas is admitted into the ascending pipe through an inlet having a controllable or constant intake, a non-return valve closing in the direction away from the mixing member being provided in the ascending pipe as well as in the compressed gas conduit discharging into said pipe, the latter non-return valve being located between the inlet controlling the rate of flow in said compressed gas conduit and the mixing member.

According to the invention the inlet determining the rate of flow in the compressed gas conduit can discharge into a chamber-like portion of the compressed gas conduit, which portion is accessible from the outside and which can be closed.

Furthermore the invention opens up the possibility of connecting more than one mixing member with an associated discharge cock to the ascending pipe.

In order to obtain as small as possible a resistance of the mixing member(s) at an optimal mixing action thereof, it is to be recommended, that the mixing member or each of the mixing members comprise of at least one sleeve having a core fitting therein, while at least one of the walls of the sleeve or the core, turned towards each other is provided with intersecting, helical left and right-handed grooves, the left-handed grooves differing in number and/or in pitch from the right-handed grooves. This is instrumental to the prevention of breakdowns.

The invention is illustrated hereinafter with reference to the accompanying drawing, showing an embodiment of the apparatus.

Figure 1:
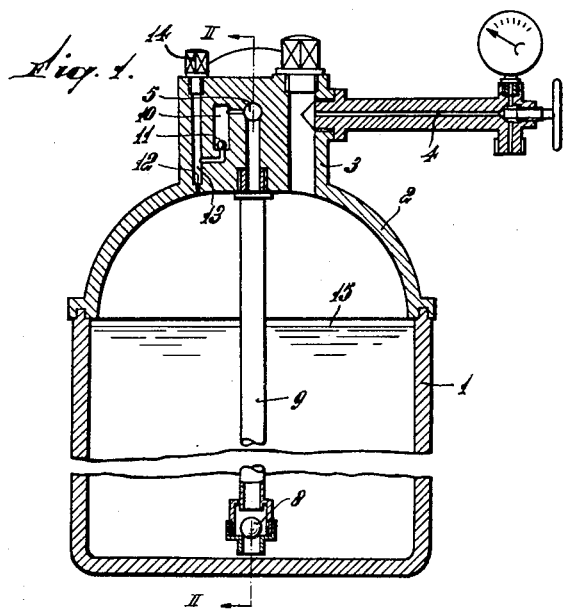
Fig. 1 shows a vertical section on the line I—I in Fig. 2.

According to the drawing the apparatus comprises a vessel 1, which is closed by a detachable cover 2. In the cover a filling opening 3 adapted to be closed by a screw cap, to which a supply pipe 4 provided with a valve and a pressure gauge is connected, which supply pipe is adapted to be coupled with a compressed gas tank.

Furthermore the cover is provided with a conduit 5, while to the two extremities of the horizontal branch one or more mixing members 6 with an associate discharge cock 7, and to the vertical branch an ascending pipe 9, which reaches approximately to the bottom of the vessel and which is provided with a non-return valve 8, are connected.

To the conduit 5 a duct 10 provided in the cover 2, is connected, which duct is provided with a non-return valve 11 in a widened portion of said duct. The rate of flow in the conduit 5 is determined by the narrow inlet port 12, which discharges into a chamber-like portion 13 of the conduit 5, which portion 13 is closed by a screw cap 14 and which is accessible from the outside after the removal of said cap.

When the apparatus is used the vessel 1 is partly filled with a liquid, for example cream, and after closing the vessel compressed gas is admitted above the level of the liquid 15 through the supply pipe 4.

When the discharge cock 7 of one of the mixing members 6 is opened the compressed gas will press the liquid via the ascending pipe 9 and the conduit 5 to the mixing member in question to be mixed therein with the compressed gas supplied to the conduit 5 through the inlet port 12 and the compressed gas conduit 10, to form whipped cream.

After the discharge cock 7 is closed the liquid left in the mixing member 6 will have the tendency to flow back. This is, however, prevented by the non-return valves 8 and 11, so that the narrow inlet port 12, having a diameter of the order of magnitude of 0.5 mm., is protected from becoming clogged up.

Figure 2:
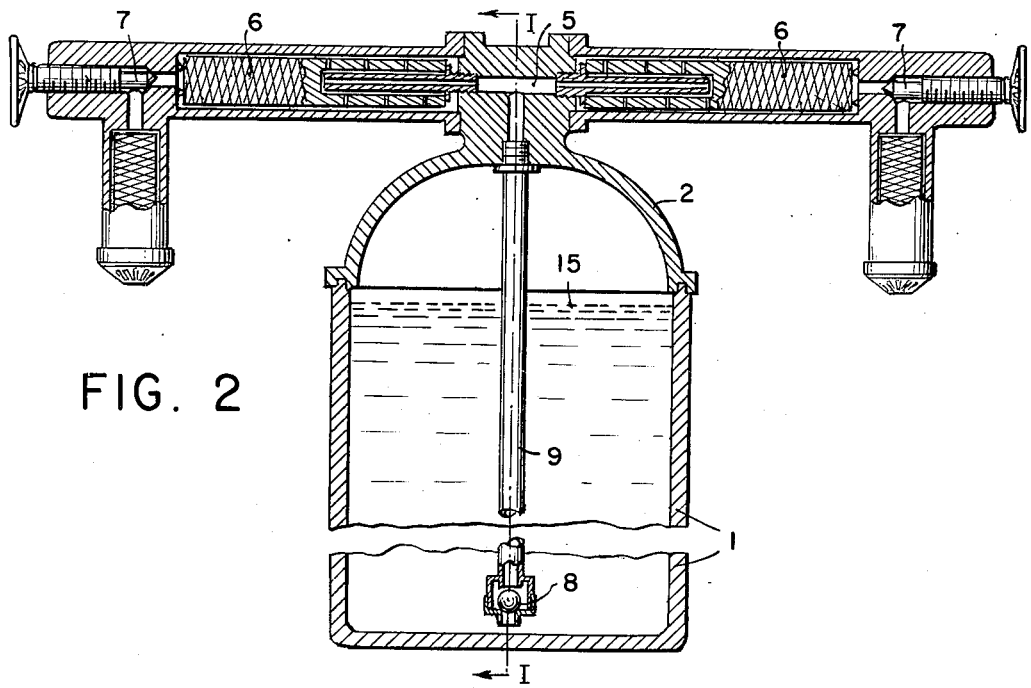
Fig. 2 shows a vertical section on the line II—II in Fig. 1.
Figure 3:
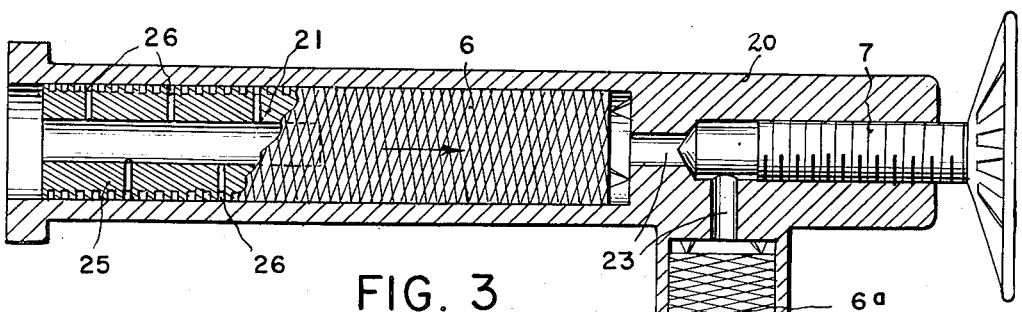
Fig. 3 shows an enlarged view, partly in section, of the right hand discharge portion of Fig. 2.
Figure 4:
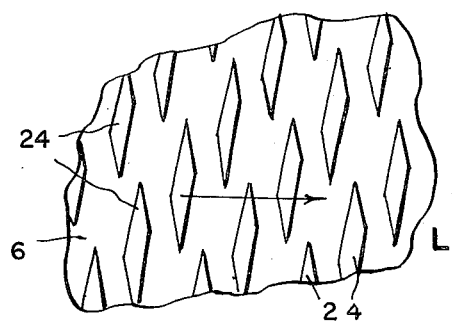
Fig. 4 shows a detail view of the channels in the right hand mixing member of Fig. 2; the arrow points in the direction of flow of the mixture.

In Figs. 2, 3 and 4 it is shown that each mixing member comprises a holder body 20 with two hollow branches 21 and 22, interconnected by a passage 23, which passage can be closed by a valve 7. In each of the branches a core 6 and 6a respectively fitting therein is located. The cores 6 and 6a are externally provided with intersecting multiple left and right handed screw thread, so that a labyrinth of intersecting channels 24 is formed.

The core 6 has its inlet end provided with an axial bore 25 which through radial passages 26 communicates with the labyrinth of the channels 24 provided on the outer periphery of the core 6. The liquid and gas supplied from the vessel of the apparatus is forced into the labyrinth formed by the channels 24 on the core 6 via the bore 25 in the passages 26 and upon passing through this labyrinth the gas and liquid are intimately mixed. This mixing is continued, if necessary, upon the mixture passing the core 6a which to that end has its outer periphery provided with a corresponding labyrinth of channels.

If owing to the apparatus being out of operation for a prolonged period of time the inlet port 12 should become clogged up all the same, thus jeopardizing the correct operation of the apparatus, it is possible to relieve the pressure in the duct 10 between the clogged inlet port 12 and the non-return valve 11 by removing the screw cap 14, so as to enable the compressed gas over the level of the liquid, the pressure of which gas usually amounts to about 6 atm., to blow through the inlet port 12.

Should this not succeed, the inlet port can be cleaned by means of a needle to be introduced into the space 13, from the outside. In both cases the breakdown caused by the inlet port 12 being clogged, can be removed with the least possible loss of time, and while the apparatus is kept under the pressure of the compressed gas.

In deviation from the embodiment described, in which use is made of an inlet port affording a constant rate of flow in the compressed gas conduit, this inlet port can consist of a needle valve having a controllable intake. In case this valve gets clogged up it can be put into operation again in the same quick and simple manner.

As a result of the efficient manner in which the inlet port of the compressed gas conduit can be cleaned if it should become clogged after all, the important advantage is obtained moreover that more than one mixing member can be connected to the same ascending pipe and the compressed gas conduit discharging therein, whereby a considerable simplification relative to the known apparatus of the type in question can be obtained, without the risk of break-downs being increased thereby.

As appears from the drawing the mixing members 6 are provided with helical left-handed and right-handed grooves.

The left-handed grooves can differ in number and/or in pitch from the right-handed grooves. Thus, the resistance of the mixing members is kept as small as possible, while the mixing action is optimal.

I claim:

1. An apparatus for mixing and delivering a foamy substance such as whipped cream comprising a closed vessel, a compressed gas supply pipe discharging into said vessel, an ascending vertical pipe for the liquid contained in said vessel which reaches approximately to the bottom of said vessel, a duct interconnecting said vertical pipe and a mixing member with an associated discharge cock, a conduit with a restricted inlet port interconnecting the inner space of the vessel above its liquid contents and the said duct, a non-return valve in the vertically placed pipe near its lower end, and a non-return valve in the conduit between its restricted inlet port and its discharge end.

2. An apparatus as in claim 1 comprising a chamber-like portion in line with and connected to the inlet port of the said conduit at a place between said inlet port and the non-return valve within said conduit, said chamber-like portion being accessible from the outside by removing a removable plug.

3. An apparatus as in claim 1 comprising a plurality of mixing members each with an associated discharge cock and each connected to the said duct.

LEONARDUS BERNARDINUS HEESEN.

References Cited in the file of this patent
UNITED STATES PATENTS

| Number | Name | Date |
|---|---|---|
| 1,457,895 | Campanella | June 5, 1923 |
| 2,119,906 | Dorman | June 7, 1938 |

FOREIGN PATENTS

| Number | Country | Date |
|---|---|---|
| 490,186 | Great Britain | Aug. 10, 1938 |